(12) United States Patent  
Miyauchi

(10) Patent No.: US 8,199,807 B2  
(45) Date of Patent: Jun. 12, 2012

(54) CONTENTS PROVIDING APPARATUS AND CONTENTS PROVIDING METHOD

(75) Inventor: Hiroyuki Miyauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1308 days.

(21) Appl. No.: 11/898,437

(22) Filed: Sep. 12, 2007

(65) Prior Publication Data

US 2008/0069205 A1    Mar. 20, 2008

(30) Foreign Application Priority Data

Sep. 20, 2006  (JP) ................................. 2006-254703

(51) Int. Cl.
H04N 7/12 (2006.01)
H04N 5/93 (2006.01)

(52) U.S. Cl. .................................. 375/240.01; 386/353

(58) Field of Classification Search .................. None
See application file for complete search history.

(56) References Cited

U.S. PATENT DOCUMENTS

| | | | | |
|---|---|---|---|---|
| 5,748,835 A * | 5/1998 | Lee | ............................... | 386/339 |
| 6,148,142 A * | 11/2000 | Anderson | ..................... | 386/206 |
| 6,324,515 B1 * | 11/2001 | Rabipour et al. | ............. | 704/500 |
| 6,628,891 B1 * | 9/2003 | Vantalon et al. | ............... | 386/255 |
| 2003/0021346 A1 * | 1/2003 | Bixby et al. | ............. | 375/240.25 |
| 2004/0233997 A1 * | 11/2004 | Umesako | ................. | 375/240.26 |
| 2005/0196143 A1 * | 9/2005 | Kato et al. | ....................... | 386/69 |
| 2006/0114136 A1 * | 6/2006 | Chu et al. | ......................... | 341/52 |
| 2006/0140080 A1 * | 6/2006 | Yen et al. | ..................... | 369/47.1 |
| 2008/0247728 A1 * | 10/2008 | Witham | ......................... | 386/68 |
| 2009/0123081 A1 * | 5/2009 | DeLuca | ........................ | 382/234 |

FOREIGN PATENT DOCUMENTS

WO    WO 00/51347    8/2000

OTHER PUBLICATIONS

U.S. Appl. No. 11/896,888, filed Sep. 6, 2007, to Miyauchi.

* cited by examiner

*Primary Examiner* — Clemence Han  
(74) *Attorney, Agent, or Firm* — Finnegan, Henderson, Farabow, Garrett & Dunner, L.L.P.

(57) ABSTRACT

A contents providing apparatus includes storage which records contents with plural types of formats, output ports which respectively output contents read from the storage, decoders which are connected to the output ports and respectively correspond to the formats, channels which respectively provide contents decoded by the decoders, a switcher which selectively derives one of outputs of the decoders to a specified one of the channels, a table which expresses the output ports connected to the decoders corresponding to the plural types of formats and status conditions of the decoders, CPU which assigns an available one of the output ports which corresponds to the format of the specified contents based on the table.

4 Claims, 3 Drawing Sheets

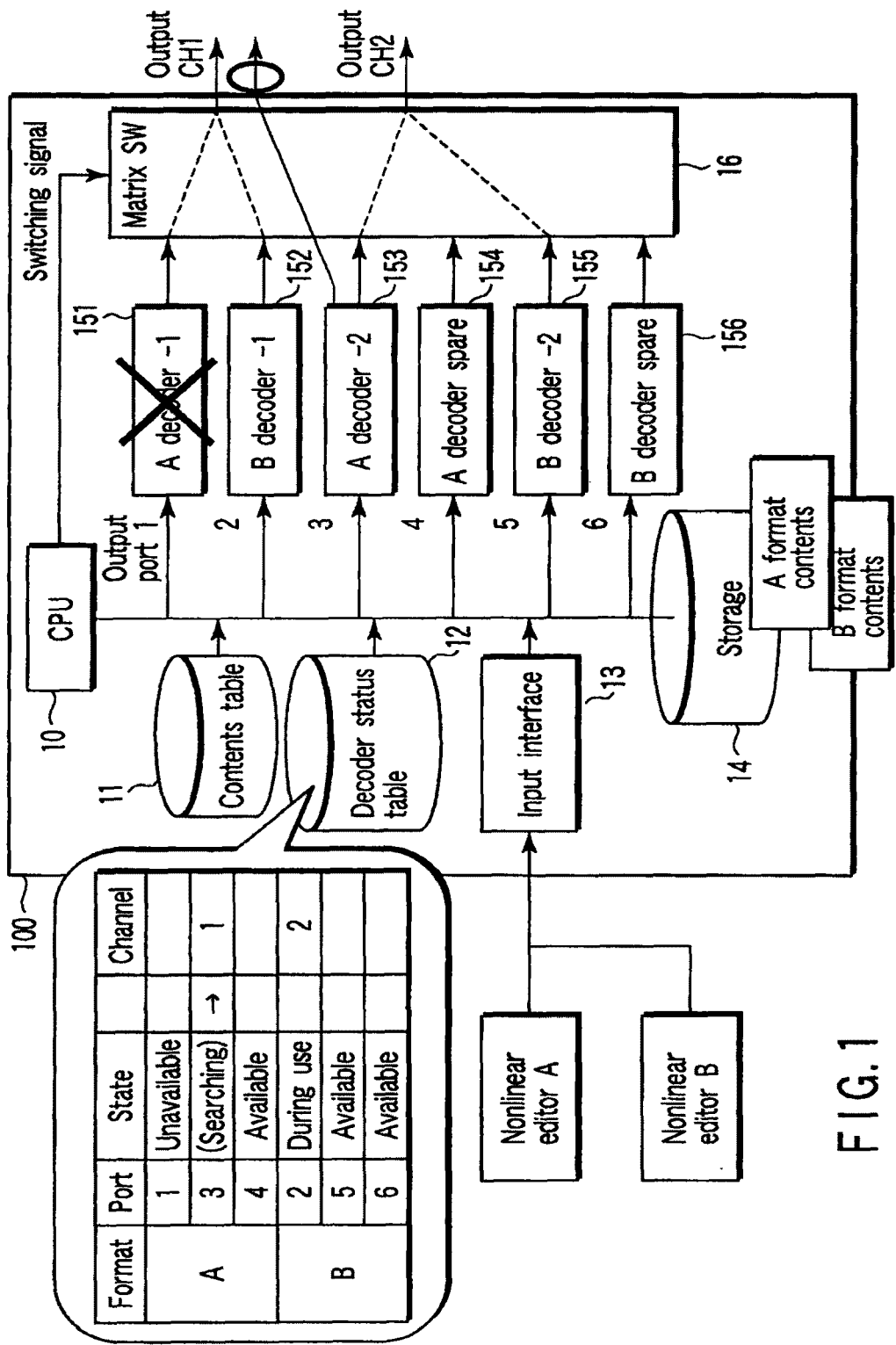
F I G. 1

CONTENTS PROVIDING APPARATUS AND CONTENTS PROVIDING METHOD

CROSS-REFERENCE TO RELATED APPLICATIONS

This application is based upon and claims the benefit of priority from prior Japanese Patent Application No. 2006-254703, filed Sep. 20, 2006, the entire contents of which are incorporated herein by reference.

BACKGROUND OF THE INVENTION

1. Field of the Invention

This invention relates to a contents providing apparatus and contents providing method which provide contents with a plurality of different coding formats.

2. Description of the Related Art

Video contents and audio contents are encoded according to coding formats used in respective nonlinear editors. In order to provide contents with plural types of coding formats by use of a contents providing apparatus, it is necessary to provide decoders which can cope with the respective coding formats. In a general contents providing apparatus, since one decoder board is directly connected to one output channel, it becomes necessary to physically replace a decoder board when the decoder board of a certain output channel has failed. Therefore, there occurs a problem that timing to reproduce contents is late.

There is proposed a method for nonlinearly editing a coding format without standardizing the coding formats even when contents with plural types of coding formats is provided together by using a multi-format decoder which can decode the contents with plural types of coding formats (for example, refer to the International Patent Disclosure No. WO00/51347).

BRIEF SUMMARY OF THE INVENTION

An object of this invention is to provide a contents providing apparatus and contents providing method which can continuously provide contents without physically replacing decoders even when the decoder has failed.

According to one aspect of the present invention, there is provided a contents providing apparatus comprising storage which records contents with plural types of formats and reads specified contents to be reproduced, a plurality of output ports which respectively output contents read from the storage, a plurality of decoders which are connected to the output ports and respectively correspond to the plural types of formats, a plurality of channels which respectively provide contents decoded by the decoders, a switcher which selectively derives one of outputs of the decoders to a specified one of the channels, a table which expresses the output ports connected to the decoders corresponding to the plural types of formats and status conditions of the decoders, a monitoring section which monitors during use, available and unavailable status conditions for each of the decoders, registers the status conditions into the table, and a connecting section to assign an available one of the output ports which corresponds to the format of the specified contents based on the table and to connect an output of the decoder connected to the assigned output port to the specified channel via the switcher.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing one embodiment of a contents providing apparatus according to this invention.

DETAILED DESCRIPTION OF THE INVENTION

Figures 2, 3:
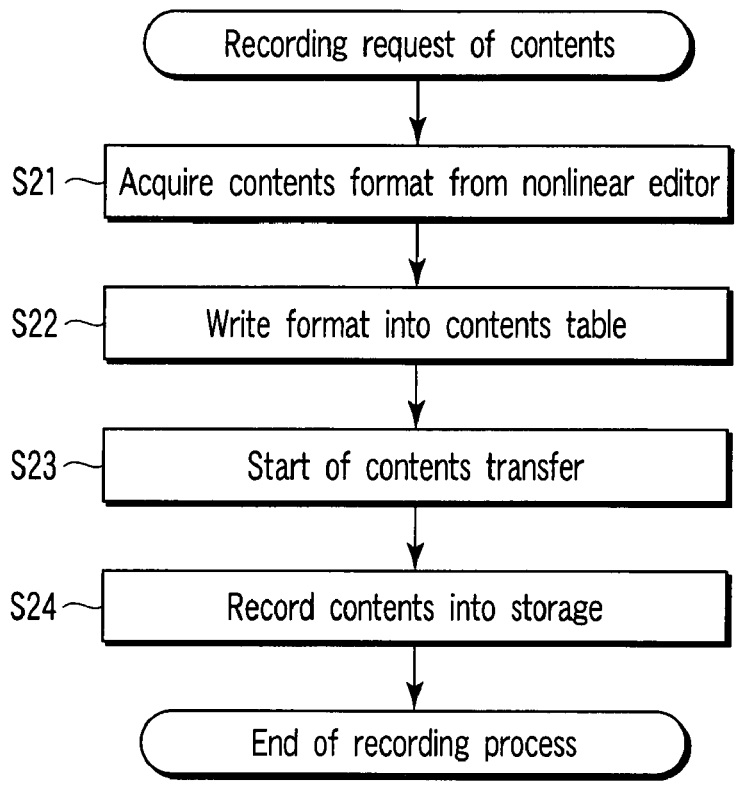
FIG. 2 is a flowchart for illustrating the procedure of a contents recording process of the contents providing apparatus shown in FIG. 1.
FIG. 3 is a diagram showing one example of a contents table.

There will now be described an embodiment of the present invention in detail with reference to the accompanying drawings.

FIG. 1 is a block diagram showing one embodiment of a contents providing apparatus according to this invention.

A contents providing apparatus 100 includes a central processing unit (CPU) 10, contents table 11, decoder status table 12, input interface 13, storage 14 configured by a RAM or hard disk, decoders 151 to 156 and matrix switcher 16.

Nonlinear editors A and B are connected to the input interface 13. The nonlinear editors A and B transfer video contents with different coding formats to the contents providing apparatus 100. For example, it is supposed that the nonlinear editor A generates video contents coded in a Moving Picture Experts Group Phase 2 (MPEG-2) form and the nonlinear editor B generates video contents coded in a Digital Video (DV) form. In this case, the contents transfer source is not limited to the nonlinear editor, but another server system or the like may be used. Further, the above contents are not limited to the video contents, but audio contents can also be used.

The CPU 10 causes the input interface 13 to fetch video contents transferred from the nonlinear editors A and B and records the same into the storage 14. In this example, it is supposed that the video contents transferred from the nonlinear editor A is set to have an A format contents and the video contents transferred from the nonlinear editor B is set to have a B format contents. Further, at the time of recording the contents, the CPU 10 acquires format information of to-be-recorded contents from the nonlinear editor of the contents transfer source and stores the same into the contents table 11.

In addition, the contents providing apparatus 100 includes six output ports (to which port numbers 1 to 6 are respectively assigned) which derive video contents selectively read from the storage 14 in response to instructions from the CPU 10. The decoders 151, 153, 154 for the A format are connected to the output ports with the port numbers 1, 3, 4. Further, the decoders 152, 155, 156 for the B format are connected to the output ports with the port numbers 2, 5, 6. The decoders 151 to 156 decode the contents of the respective formats to broadcast video data items. Outputs of the decoders 151 to 156 are selectively derived to two-series output channels CH1, CH2 via the matrix switcher 16.

The decoders 151 to 156 are managed by the decoder status table 12 which expresses the status conditions together with the corresponding relation between the formats and port numbers. The CPU 10 monitors the status conditions (during use/available/unavailable) of the decoders 151 to 156 and registers the status conditions into the decoder status table 12. For example, as shown in FIG. 1, the status conditions of the decoders are registered into the decoder status table 12 such that the decoder corresponding to the port number 1 is set in the "unavailable (failure)" state, the decoder corresponding to the port number 2 is set in the "during use" state and the decoders corresponding to the port numbers 3, 4, 5, 6 are set in the "available" state.

When receiving a contents reproducing request, the CPU 10 refers to the decoder status table 12 to assign an output port which corresponds to the format and is available and output a switching signal to the matrix switcher 16. The matrix switcher 16 performs a switching operation to connect the output port of the specified decoder to the specified output channel according to the switching signal output from the CPU 10.

Next, the operation of the contents providing apparatus 100 with the above configuration is explained.

(Contents Recording Process)

FIG. 2 is a flowchart for illustrating the procedure of a contents recording process of the contents providing apparatus 100.

When receiving a recording request of contents from the nonlinear editor A or B, the CPU 10 acquires format (CODEC form) information and the like of the contents from the nonlinear editor of a request source (step S21). The CPU 10 writes the acquired format information into the contents table 11 (step S22). FIG. 3 is a diagram showing one example of the configuration of the contents table 11. As shown in FIG. 3, in the contents table 11, formats (CODEC forms), contents names, the lengths of the contents and the like are stored in correspondence to contents IDs which express the contents. The CPU 10 instructs a nonlinear editor of a request source to start transfer of the contents data (step S23) and records the contents data input via the input interface 13 into the storage 14 (step S24).

(Contents Reproducing Process)

Figure 4:
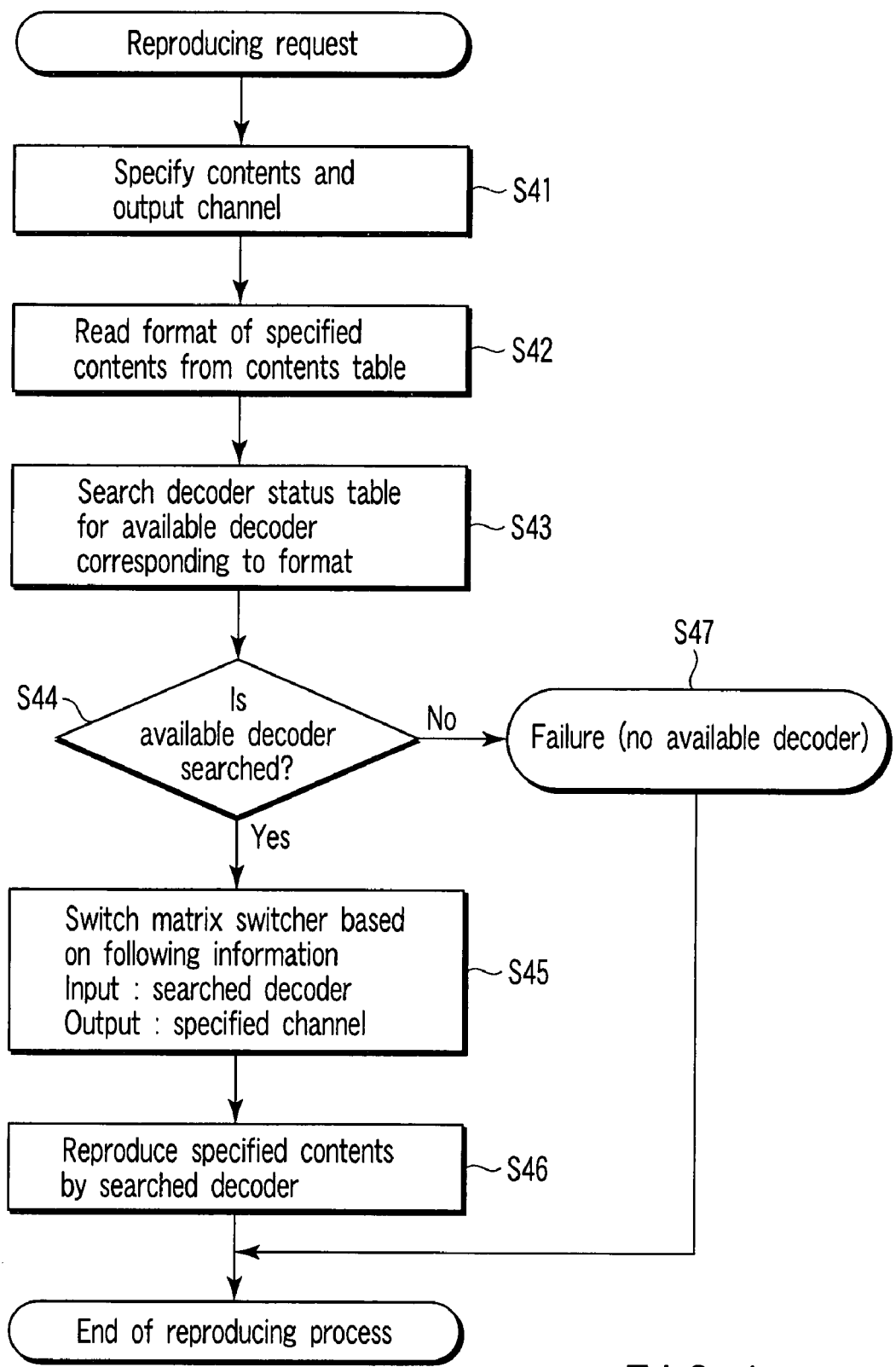
FIG. 4 is a flowchart for illustrating the procedure of a contents reproducing process of the contents providing apparatus shown in FIG. 1.

FIG. 4 is a flowchart for illustrating the procedure of a contents reproducing process of the contents providing apparatus.

First, the CPU 10 receives specification of to-be-reproduced contents and an output channel (step S41) and reads a format (CODEC form) of the specified contents from the contents table 11 (step S42). Then, the CPU 10 refers to the decoder status table 12 to search for a decoder which corresponds to the format of the contents and is available (step S43).

In the above searching process, the CPU 10 determines whether a decoder which corresponds to the format and is available is successfully searched for or not (step S44), and if it is determined that the decoder is searched for ("YES"), the CPU 10 provides a switching signal to the matrix switcher 16 and performs a control operation to switch the output terminal of the searched decoder to the specified output channel (step S45). The CPU 10 causes the searched decoder to decode and provide the specified contents (step S46).

If it is determined in the determination process of the step S44 that an available decoder is not searched for ("NO"), the CPU 10 outputs a response indicating that "there is no available port" as a failure condition and terminates the process (step S47).

For example, in the case of FIG. 1, when it is specified to output contents with the A format from the output channel CH1, the CPU 10 reads format information from the contents table 11 and determines that it corresponds to the A format. Then, the CPU 10 refers to the decoder status table 12 to search for an output port connected to the available decoder among the output ports connected to the decoders corresponding to the A format. In this example, the output port 3 is searched for and the CPU 10 causes the matrix switcher 16 to switch the output terminal of the decoder 153 to the output channel CH1. As a result, the contents decoded by the decoder 153 is output from the specified output channel CH1.

As described above, in the present embodiment, when decoders with a plurality of formats are connected to the contents providing apparatus, (n+1) or more decoders for respective formats and a switcher for switching the decoders and outputting contents are provided in order to attain a plurality of output channels (n channels). Further, the contents providing apparatus has a decoder status table which manages the states (during use/available/unavailable) of the decoders. When receiving a reproducing request of contents, the contents providing apparatus searches for a decoder which corresponds to the format of the contents and is available and performs a control operation to switch the output terminal of the searched decoder to the output terminal of a specified channel.

In the conventional contents providing apparatus, since one decoder is directly connected to one output channel, it becomes necessary to replace a decoder board when the decoder of a certain output channel has failed. Therefore, there occurs a problem that the contents reproducing time becomes longer. On the other hand, according to the present embodiment, since contents can be continuously provided from a specified output port even when the decoder has failed, the stable operation of the contents providing apparatus can be attained.

This invention is not limited to the above embodiment. For example, in the above embodiment, a case wherein the number of output channels of the contents providing apparatus 100 is 2 and the number of decoders of each format is 3 is explained, but this invention is not limited to this case. However, when the total number of output channels is n, the number of decoders is set to (n+1) or more for each format. Further, the number and the types of formats of contents supported by the contents providing apparatus 100, the configuration and the procedure of the process of the contents providing apparatus 100 and the processing thereof can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A contents providing apparatus comprising:
   storage which records contents with plural types of formats and reads specified contents to be reproduced,
   a plurality of output ports which respectively output contents read from the storage, a plurality of decoders which are connected to the output ports and respectively correspond to the plural types of formats, a plurality of channels which respectively provide contents decoded by the decoders, a switcher which selectively derives one of outputs of the decoders to a specified one of the channels, a table which expresses the output ports connected to the decoders corresponding to the plural types of formats and status conditions of the decoders, a monitoring section which monitors during use, available and unavailable status conditions for each of the decoders, registers the status conditions into the table, and a connecting section to assign an available one of the output ports which corresponds to the format of the specified contents based on the table and to connect an output of the decoder connected to the assigned output port to the specified channel via the switcher.

2. The contents providing apparatus according to claim 1, wherein the number of decoders is set to at least (n+1) for each type of formats when the number of channels is set to n.

3. A method used for a contents providing apparatus including storage which records contents with plural types of formats and reads a specified contents to be reproduced, a plurality of output ports which respectively output contents read from the storage, a plurality of decoders which are connected to the output ports and respectively correspond to the plural types of formats, a plurality of channels which respectively provide contents decoded by the decoders, a switcher which selectively derives one of outputs of the decoders to a specified one of the channels, and a table which expresses the output ports respectively connected to the decoders corresponding to the plural types of formats and status conditions of the decoders, comprising:

monitoring during use, available and unavailable status conditions for each of the decoders, registering the status conditions into the table, assigning a available one of the output ports which corresponds to the format of the specified contents based on the table, and connecting an output of the decoder connected to the assigned output port to the specified channel via the switcher.

4. The method according to claim 3, wherein the number of decoders is set to at least (n+1) for each type of formats when the number of channels is set to n.

* * * * *